(12) United States Patent
Hayasaka et al.

(10) Patent No.: US 7,089,986 B2
(45) Date of Patent: Aug. 15, 2006

(54) LAMINATING APPARATUS FOR OPTICAL DISC

(75) Inventors: Takuya Hayasaka, Tokyo (JP);
Takeshi Yamasaki, Tokyo (JP);
Tomomi Yukumoto, Tokyo (JP)

(73) Assignees: Lintec Corporation, Tokyo (JP); Sony Corporation, Tokyo (JP)

( * ) Notice: Subject to any disclaimer, the term of this patent is extended or adjusted under 35 U.S.C. 154(b) by 224 days.

(21) Appl. No.: 10/288,583

(22) Filed: Nov. 6, 2002

(65) Prior Publication Data

US 2003/0098131 A1    May 29, 2003

(30) Foreign Application Priority Data

Nov. 7, 2001    (JP)    ............................. 2001-342177

(51) Int. Cl.
*B32B 37/02* (2006.01)
*B32B 37/10* (2006.01)
*H01L 21/68* (2006.01)
*H01L 21/683* (2006.01)
*H01L 21/687* (2006.01)

(52) U.S. Cl. .................... 156/556; 156/235; 156/247; 156/540; 156/542; 156/556; 156/559; 156/584

(58) Field of Classification Search ................ 156/230, 156/235, 344, 538–542, 580, 584, 247–249, 156/559, 563; 257/E21.499, E21.505
See application file for complete search history.

(56) References Cited

U.S. PATENT DOCUMENTS

| 3,682,743 A | 8/1972 | Cleary et al. |
| 4,366,023 A * | 12/1982 | Voltmer .................... 156/542 |
| 5,980,677 A * | 11/1999 | Amo et al. ................. 156/230 |
| 6,200,402 B1 * | 3/2001 | Amo .......................... 156/235 |

FOREIGN PATENT DOCUMENTS

| DE | 2 009 816 | 3/1972 |
| DE | 195 33 775 | 3/1997 |
| DE | 10029399 A1 * | 12/2000 |
| DE | 10029400 A1 * | 1/2001 |
| EP | 0 854 477 | 7/1998 |
| EP | 0 932 149 | 7/1999 |
| EP | 1 059 157 | 12/2000 |
| GB | 2159763 | 12/1985 |
| JP | 2000-90499 | 3/2000 |
| JP | 2003-524273 | 8/2003 |
| WO | WO 200076752 A1 * | 12/2000 |

* cited by examiner

*Primary Examiner*—Sue A. Purvis
(74) *Attorney, Agent, or Firm*—Lowe Hauptman Berner, LLP.

(57) ABSTRACT

A laminating apparatus 20 for a DVR as an optical disc comprises front side peeling means 24 for peeling a protective film P1 from a protective label L having the protective film P1 and a release-liner D adhered thereto, a peel plate 25 for peeling off the release-liner D from the protective label L from which the protective film P1 has been peeled, and laminating means 29 for laminating the protective label L after the peeling of the protective film P1 and the release-liner D to a DVR recording substrate by laminating the protective label L to the DVR recording substrate B with a predetermined pressing force.

11 Claims, 19 Drawing Sheets

FIG. 15

Effect on tangential skew by pressing force
(Feed speed 30mm/s, Roller hardness 70°)

(A)

| Pressing force (kgf) | Tangential skew increase (°) |
|---|---|
| 3 | 0.18 |
| 4 | 0.2 |
| 8 | 0.25 |

Effect on tangential skew by roller hardness
(Feed speed 30mm/s, Pressing force 4kgf)

(B)

| Rubber hardness (°) | Tangential skew increase (°) |
|---|---|
| 20 | 0.22 |
| 30 | 0.12 |
| 40 | 0.12 |
| 50 | 0.12 |

Effect on tangential skew by feed speed
(Pressing force 4kgf, Roller hardness 70°)

(C)

| Feed speed (mm/s) | Tangential skew increase (°) |
|---|---|
| 15 | 0.23 |
| 20 | 0.2 |
| 70 | 0.12 |
| 130 | 0.09 |
| 200 | 0.12 |
| 400 | 0.2 |
| 450 | 0.23 |

LAMINATING APPARATUS FOR OPTICAL DISC

BACKGROUND OF THE INVENTION

1. Field of the Invention

The present invention relates to a laminating apparatus for an optical disc and, more specifically, to a laminating apparatus for an optical disc capable of laminating a label or sheet(protective material) to an optical disc recording substrate having a predetermined recording layer.

2. Description of the Related Art

A novel recording medium called a DVR provided with a recording information layer (hereinafter, simply referred to as "recording layer") capable of recording/reproducing data of lager capacity than heretofore is about to be developed by the applicant of the present invention. This DVR is constructed by laminating a protective label made of a light transmissive polymer film or the like to a surface side of the recording layer formed on at least one side of a DVR recording substrate.

However, the DVR has a problem that a laminating operation between the DVR recording substrate and the protective label in manufacturing of the DVR provided with the recording layer for high-density reading by a blue laser becomes much more difficult compared with a conventional recording medium called a DVD for reading a recording layer of a recording substrate by an red laser. In other words, in a laminating operation carried out for the DVR of the recording substrate for such high-density reading, a pressing force and a laminating speed must be controlled more strictly during laminating compared with the case of the DVD in order to prevent very small bowing deformation of the DVR recording substrate or intrusion of bubbles that impedes reading of data on the recording layer. Thus, a manual DVR laminating operation is difficult, and there is a demand for a DVR laminating apparatus capable of preventing bowing deformation of a DVR recording substrate and intrusion of bubbles by automatically laminating a protective label to the DVR recording substrate.

SUMMARY OF THE INVENTION

A first object of the present invention is to provide a laminating apparatus for an optical disc capable of automatically laminating a protective label to a recording layer surface of an optical disc recording substrate, and increasing optical disc manufacturing efficiency.

A second object of the present invention is to provide a laminating apparatus capable of preventing bowing deformation of an optical disc recording substrate impedes recording or reading of data.

In order to achieve the first object, the invention adopts a structure in which a laminating apparatus for an optical disc obtained by laminating a protective label to become a light transmissive layer to a recording layer surface provided on one side of an optical disc recording substrate and capable of recording/reproducing information signals by light radiated from the protective label side, comprising:

peeling means for peeling a predetermined release-liner from the protective label having the release-liner superimposed on at least one of whose surfaces; and laminating means for laminating the protective label to the optical disc recording substrate by pressing the protective label to the recording layer surface of the optical disc recording substrate with a predetermined pressing force after the peeling of the release-liner. Thus, automatic laminating of the protective label to the optical disc recording substrate is made possible, increasing the optical disc manufacturing efficiency.

The invention may also be a laminating apparatus for an optical disc that is obtained by laminating a protective label to become a light transmissive layer to a recording layer surface provided on one side of an optical disc recording substrate and capable of recording/reproducing information signals by light radiated from the protective label side, wherein:

the protective label includes a sheet material superimposed on a front side and a release-liner adhered to a back side in an initial state; and comprising front side peeling means for peeling the sheet material from the protective label of the initial state; back side peeling means for peeling the release-liner from the protective label after the peeling of the sheet material therefrom; and laminating means for laminating the protective label to the optical disc recording substrate by pressing the protective label to the recording layer surface of the optical disc recording substrate by a predetermined pressing force after the peeling of the sheet material and the release-liner.

Furthermore, the invention may also be a laminating apparatus for an optical disc obtained by laminating a protective label to become a light transmissive layer to a recording layer surface provided on one side of an optical disc recording substrate and capable of recording/reproducing information signals by light radiated from the protective label side, wherein:

the protective label includes a sheet material adhered to a front side and a release-liner superimposed on a back side in an initial state; and comprising back side peeling means for peeling the release-liner from the protective label of the initial state; laminating means for laminating the protective label to the optical disc recording substrate by pressing an adhesive layer surface of the protective label exposed after the peeling of the release-liner to the recording layer surface of the optical disc recording substrate by a predetermined pressing force; and front side peeling means for peeling the sheet material from the protective label after the laminating of the protective label to the optical disc recording substrate. Thus, since the protective label is laminated to the optical disc recording substrate in the state where the sheet material is adhered to the protective label, the front side of the protective label is effectively prevented from being damaged during the laminating operation.

Further, the front side peeling means may be constituted including a pressing member for pressing and adhering an adhesive tape having adhesive strength higher than that of the sheet material to the same, and adhesive tape reel-up means provided on a downstream side of the pressing member; and the sheet material can be peeled from the protective label while the adhesive tape is reeled up by relative displacement of the sheet material and the pressing member. Thus, it is possible to peel surely the sheet material from the protective label by a relatively simple mechanism.

Furthermore, the laminating means may be constituted including a first holder for holding the optical disc recording substrate, a second holder for holding the protective label provided to be movable relative to the first holder, and a pressing member for applying a predetermined pressing force to the protective label laminated on the recording layer surface of the optical disc recording substrate by relative displacement of the first and second holders; and the pressing member can press the protective label while being gradually moved from one end side to the other end side, and the protective label is gradually laminated to the recording layer side of the optical disc recording substrate along a moving direction of the pressing member. Thus, during the laminating of the protective label to the optical disc recording substrate, air present therebetween can be released to the other end side of the protective label, and bubbles or the like can be prevented from being left on the optical disc after the laminating of the protective label.

It is preferable that pressing member is provided integrally with the second holder to be capable of pressing the protective label by the relative displacement of the first and second holders. Thus, a mechanism for independently moving the pressing member is made unnecessary, and an increase in the number of components is prevented, making it possible to miniaturize the apparatus.

It is also preferable that the pressing member includes a roller capable of rolling on the protective label and selected to have hardness of 30° or higher. Thus, occurrence of optical disc bowing deformation that impedes data reading/recording can be prevented by simple means.

Furthermore, it is preferable that the pressing member is made of a steel material having a mirror-finished surface. Thus, damaging of the surface side of the protective label caused by contact between the roller and the protective label when the roller is rolled on the protective label can be prevented.

Preferably, a pressing force applied by the pressing member to the protective label is set not higher than 4 kgf. Thus, it is possible to prevent occurrence of optical disc bowing deformation that impedes data recording/reading by simple means. Here, a moving speed of the pressing member may also be set in a range of 20 mm/s to 400 mm/s.

Furthermore, in the case where the first and/or second holder includes positioning means for holding the protective label and/or the optical disc recording substrate roughly in a fixed position, lamination of the protective label can be performed more accurately to the optical disc recording substrate.

BRIEF DESCRIPTION OF THE DRAWINGS

FIG. 15(A) is a table showing a result of measuring an effect on a tangential skew by changed pressing force of a laminating roller;

FIG. 15(B) is a table showing a result of measuring an effect on a tangential skew by changed hardness of the laminating roller;

FIG. 15(C) is a table showing a result of measuring an effect on a tangential skew by a changed feed speed of the laminating roller;

DETAILED DESCRIPTION OF THE PREFERRED EMBODIMENTS

Embodiments of the invention will be described bellow with reference to the accompanying drawings.

First Embodiment

Figure 1:
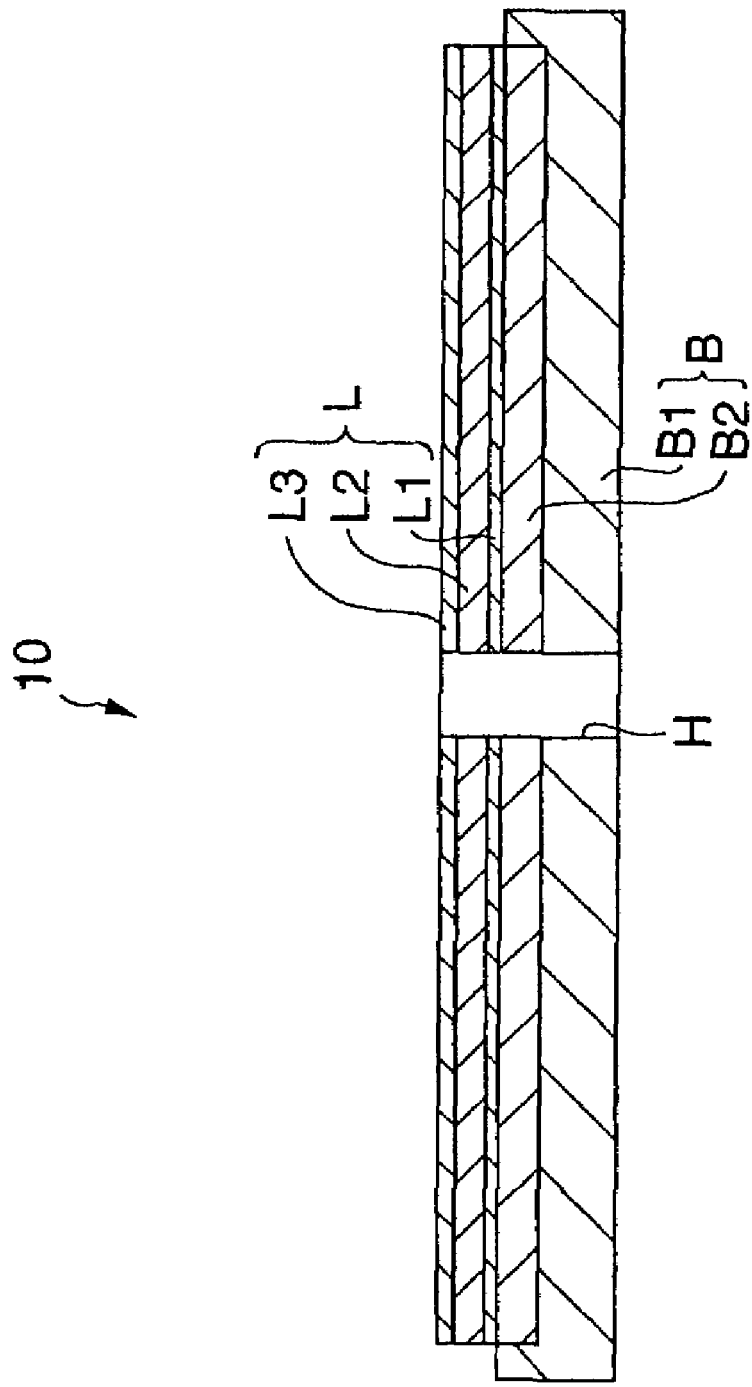
FIG. 1 is an enlarged sectional view of a DVR applied to a laminating apparatus of a first embodiment.

FIG. 1 is a schematic vertical sectional view showing a DVR 10 as a high-density optical disc applied to a laminating apparatus of a first embodiment. In the drawing, the DVR 10 is formed in an appropriate disc shape provided with a center hole H roughly penetrating a center, and composed of a DVR recording substrate B as an optical disc recording substrate positioned in a lower side, and a protective label L laminated on an upper surface side of the DVR recording substrate B. The DVR recording substrate B includes a recording layer B2 formed on an upper surface side of a polycarbonate (PC) substrate B1, and the protective label L includes an adhesive layer L1 adhered to an upper surface of a recording layer B2, a polymer film L2 on which the adhesive layer L1 is laminated, and a hard-coated layer L3 laminated on an upper surface side of the polymer film L2. The hard-coated layer L3 may be omitted.

Figure 2:
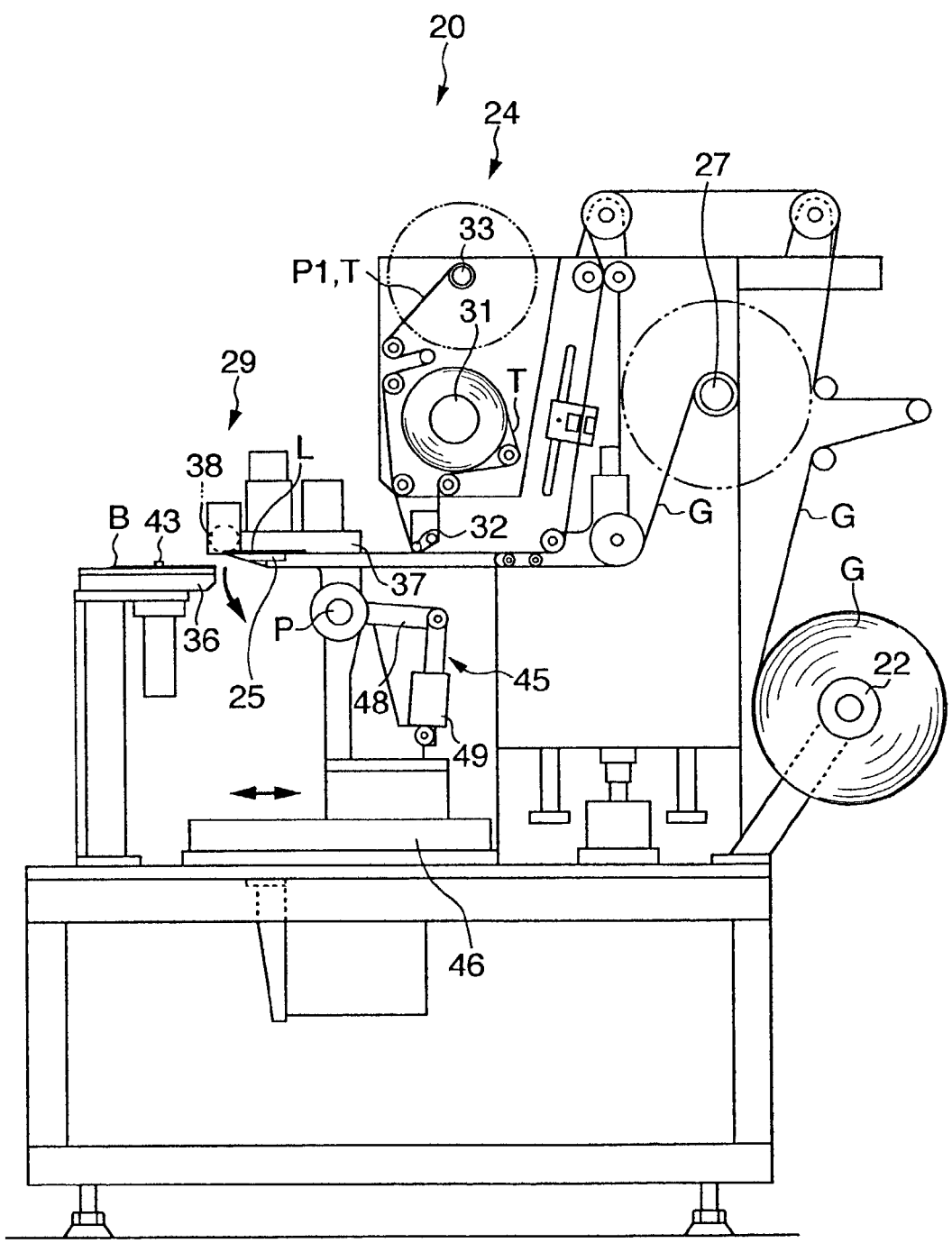
FIG. 2 is a schematic side view of the laminating apparatus.
Figure 3:
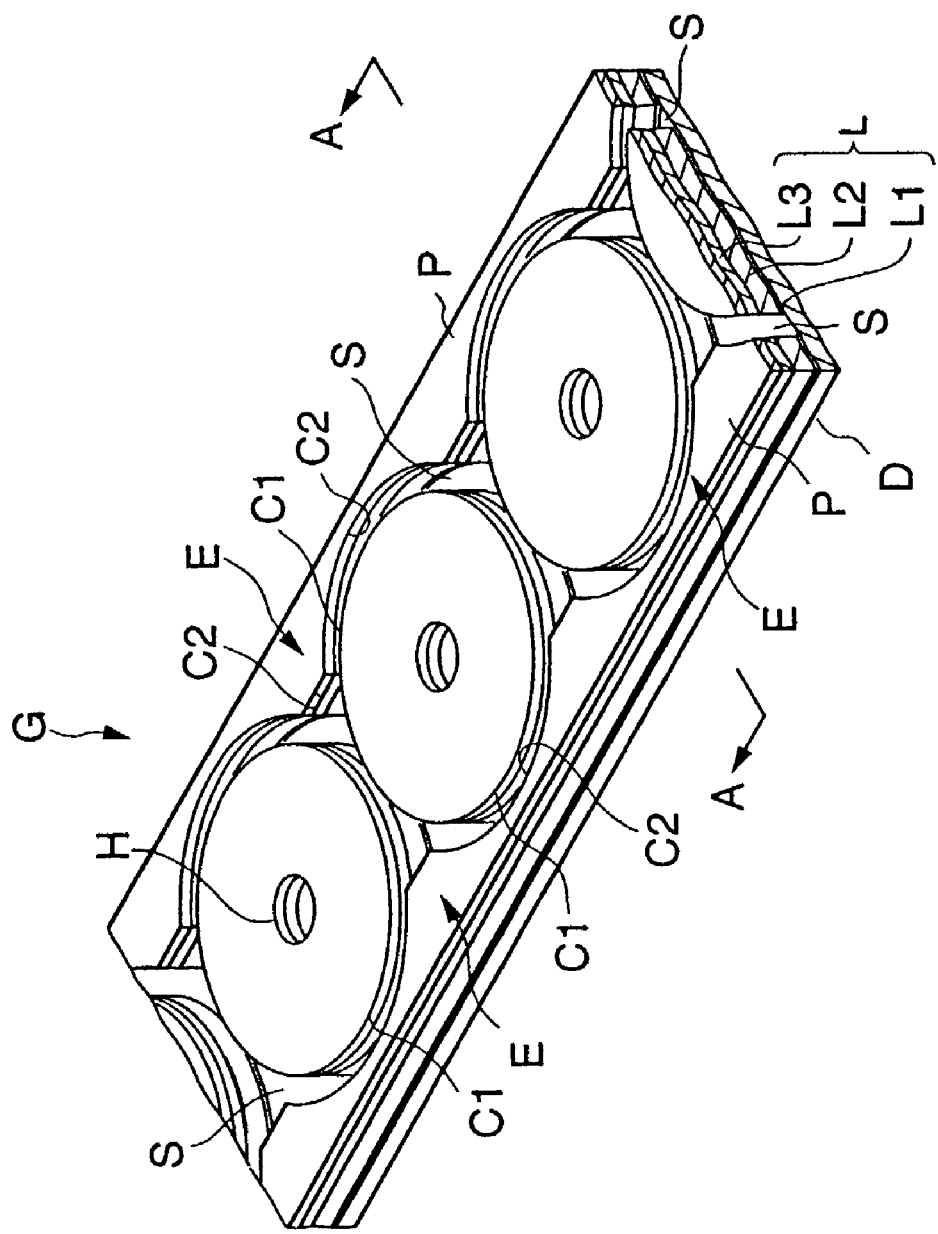
FIG. 3 is a schematic perspective view of a strip material.
Figure 4:
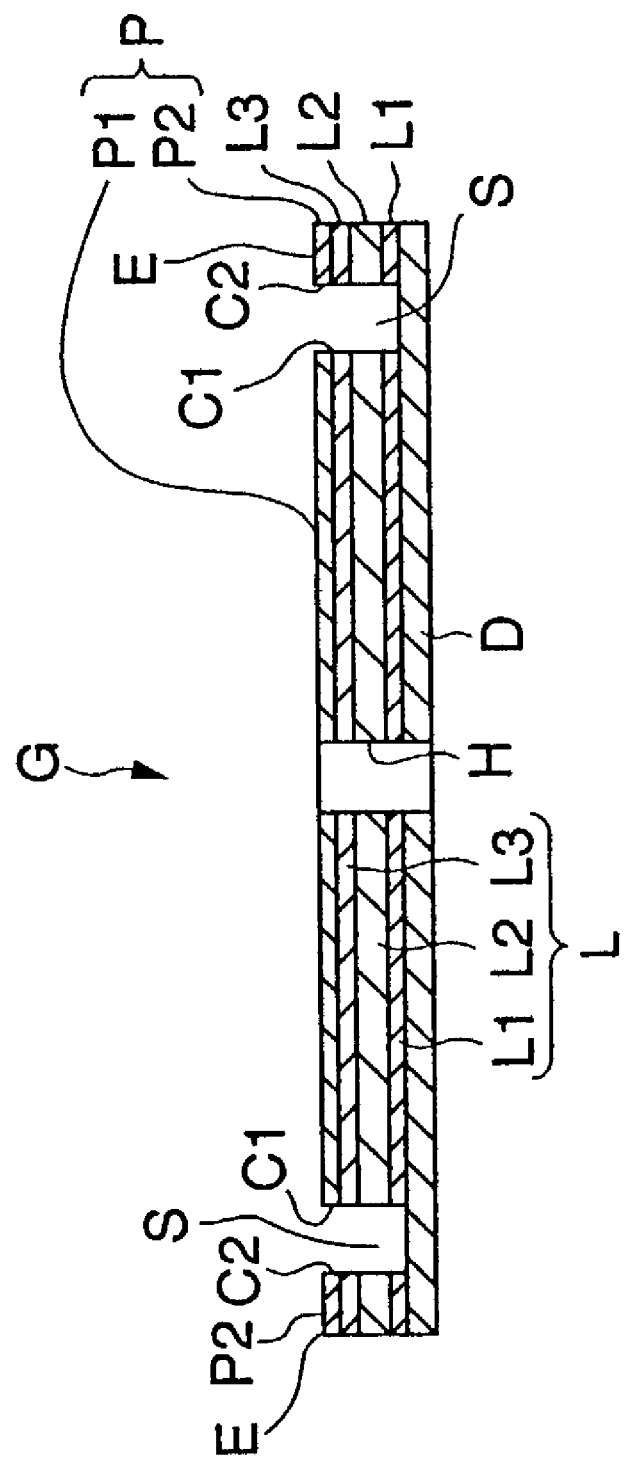
FIG. 4 is an enlarged sectional view taken along an arrow line A—A of FIG. 3.

Laminating of the protective label L to the DVR recording substrate B can be carried out by using a laminating apparatus 20 as shown in FIG. 2. The laminating apparatus 20 is constituted so that it can peel the protective label L that is a component of a strip material G, and then laminate the protective label L to the DVR recording substrate B. As shown in FIGS. 3 and 4, the strip material G includes disc-shaped precuts C1 provided at predetermined pitches, an inside of each of which becomes a protective label L, and waveform precuts C2 provided on outer peripheral sides of the disc-shaped precuts C1 to form bolster parts E. Between the disc-shaped and waveform precuts C1 and C2, a concave refuse removing part S, from which refuse has been removed by a printer (not shown) or the like in a previous step, is formed. In an initial state shown in FIGS. 3 and 4, the strip material G includes a protective film P adhered to a front (upper surface) side as a sheet material made of polyethylene terephthalate (PET) or the like, and a release-liner D made of PET or the like superimposed on a back (lower surface) side. The strip material G also includes a center hole H preformed roughly in a center position inside each disc-shaped precut C1 penetrating in upper and lower directions.

As shown in FIG. 2, the laminating apparatus 20 comprises a label supply reel 22 for holding rotatably the reeled strip material G, front side peeling means 24 for peeling off a protective film P1 on the protective label L part of the strip material G supplied from the label supply reel 22 driven by a not-shown motor, a peel plate 25 provided on a downstream side of the front side peeling means 24 to serve as back side peeling means for peeling only the protective label L from the release-liner D of the strip material G from which the protective film P1 is peeled, a release-liner reeling section 27 driven by a not-shown motor for reeling the part of the protective label L peeled off by the peel plate 25, i.e., the release-liner D having the bolster part E left, and laminating means 29 for laminating the protective label L peeled from the strip material G by the peel plate 25 to the DVR recording substrate B.

Figure 5:
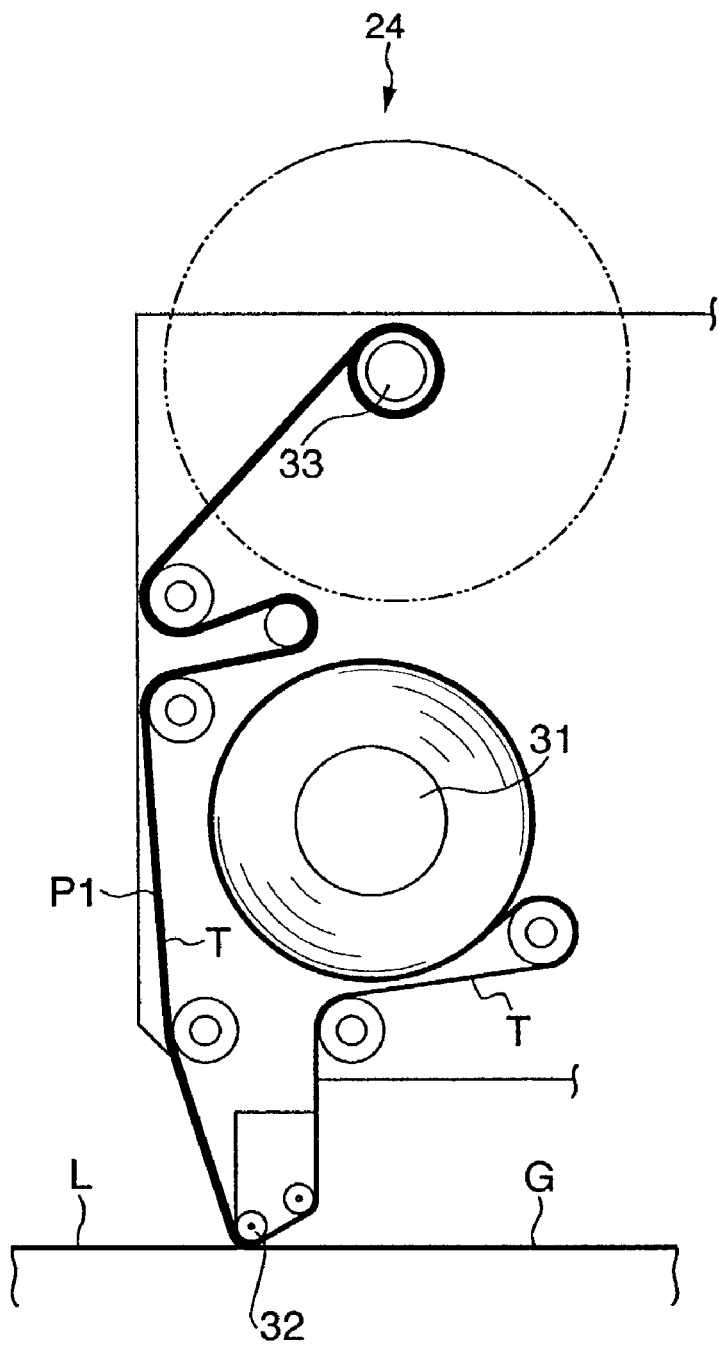
FIG. 5 is a schematic constitutional view of front side peeling means.

As shown in FIG. 5, the front side peeling means 24 includes a tape supply reel 31 for reeling and holding an adhesive tape T having adhesive strength higher than that of the protective film P on the front side of the strip material G, a peeling roller 32 as an adhesive tape pressing member for pressing the adhesive tape T supplied from the tape supply reel 31 driven by a not-shown motor to the protective film P1 of the protective label L part, and a refuse reel-up reel 33 provided on a downstream side (uppermost side in FIG. 5) of the peeling roller 32 to serve as means for reeling up the adhesive tape T.

Figure 6:
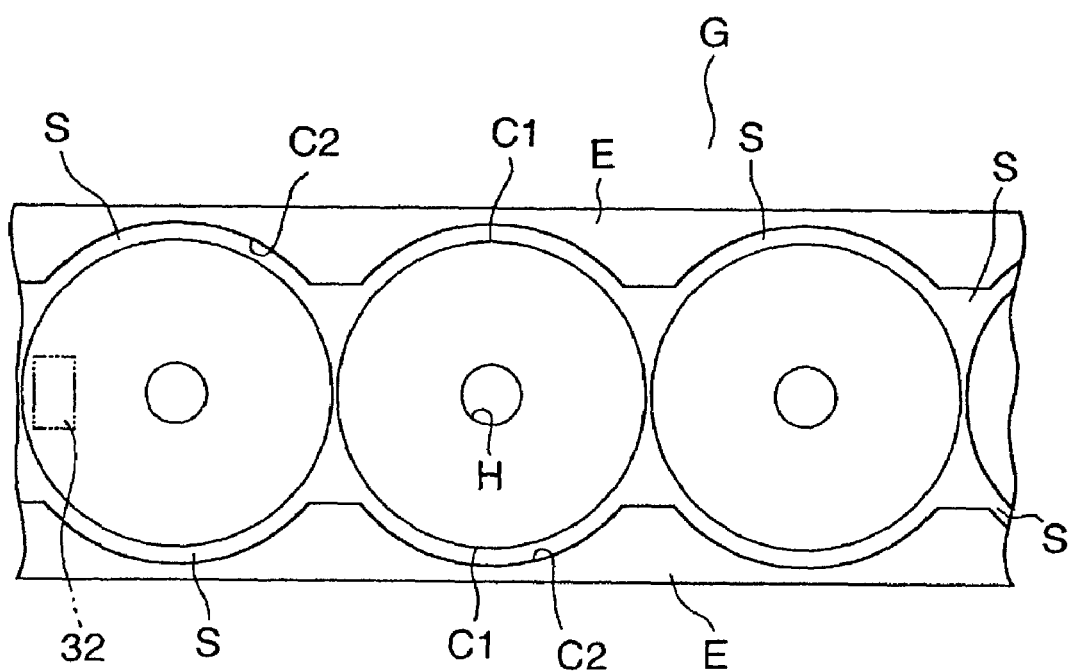
FIG. 6 is a schematic plan view of the strip material.
Figure 7:
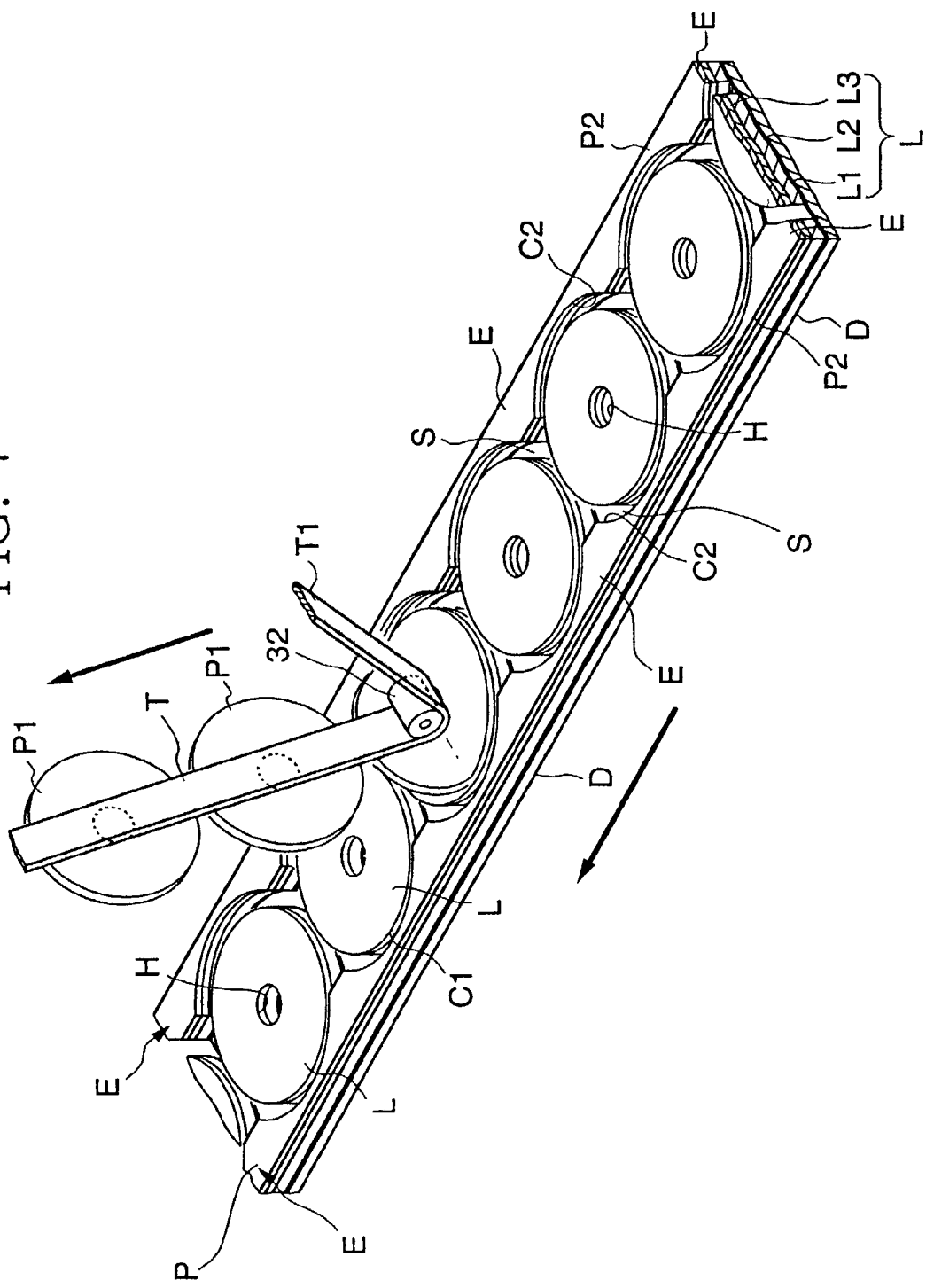
FIG. 7 is a perspective view explaining a peeling operation of the front side peeling means.

As shown in FIGS. 6 and 7, the peeling roller 32 is provided to be capable of contacting with a roughly full surface in a width direction of the protective film P, around which the adhesive tape T is wound with an adhesive surface T1 of the adhesive tape T set as front side. The adhesive surface T1 of the adhesive tape T is held on standby always in a state of being crimped to the protective film P on the front side of the strip material G by the peeling roller 32, supplied in synchronization with supplying of the strip material G, and provided with adhesive strength higher than that of the adhesive surface of the protective film P. Accordingly, on the downstream side of the peeling roller 32, relative displacement of the protective film P and the peeling roller 32 causes only the protective film P1 on the surface of the protective label L of the precut C1 formed in the disc shape to be adhered to the adhesive tape T, and gradually peeled off from the protective label L side (FIG. 7). Then, the peeled disc-shaped protective film P1 is reeled up integrally with the adhesive tape T by the refuse reel-up reel 33 (see FIG. 5). On the other hand, a remaining part of the strip material G after the peeling of the protective film P1 becomes a state where the protective label L is exposed (FIGS. 8(A) and 8(B)). The bolster part E is maintained in a state where a protective film P2 is left.

Figure 8:
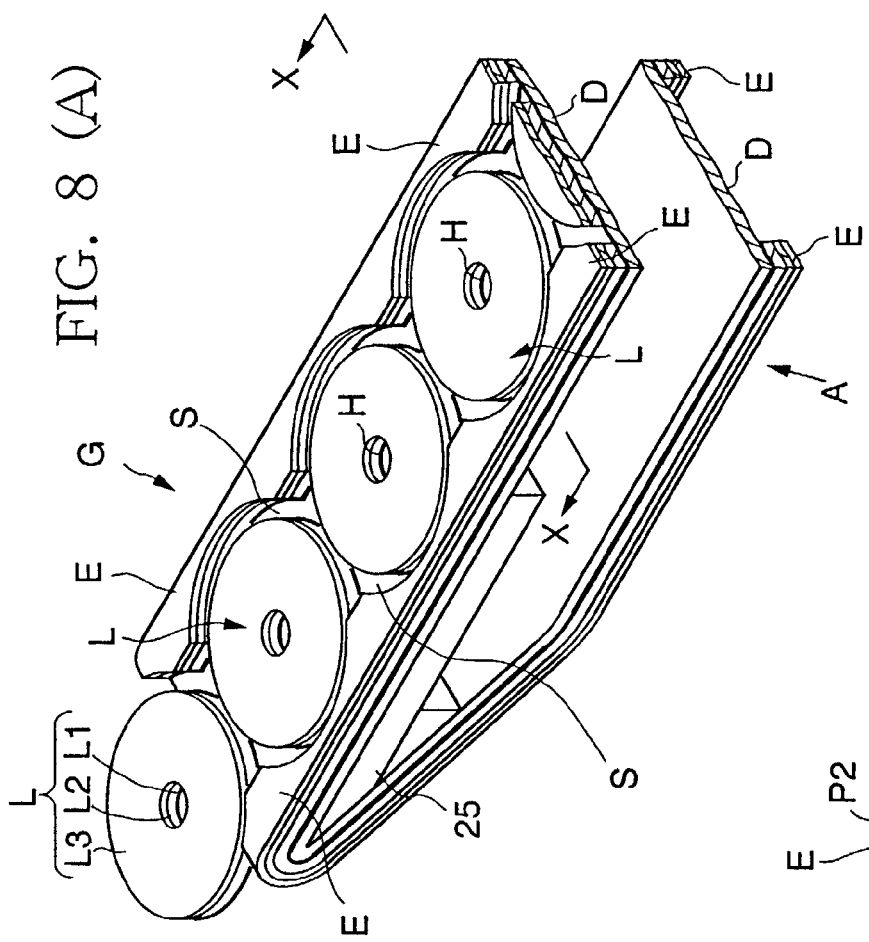
FIG. 8(A) is a perspective view explaining a peeling operation by a peel plate.
FIG. 8(B) is an enlarged sectional view taken along an arrow line X—X of FIG. 8(A)
Figure 8:
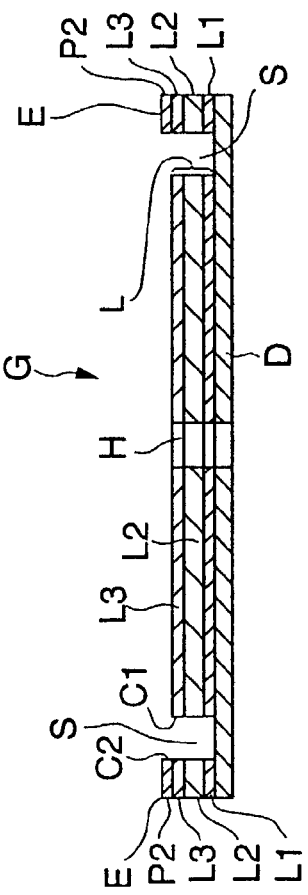
Figure 9:
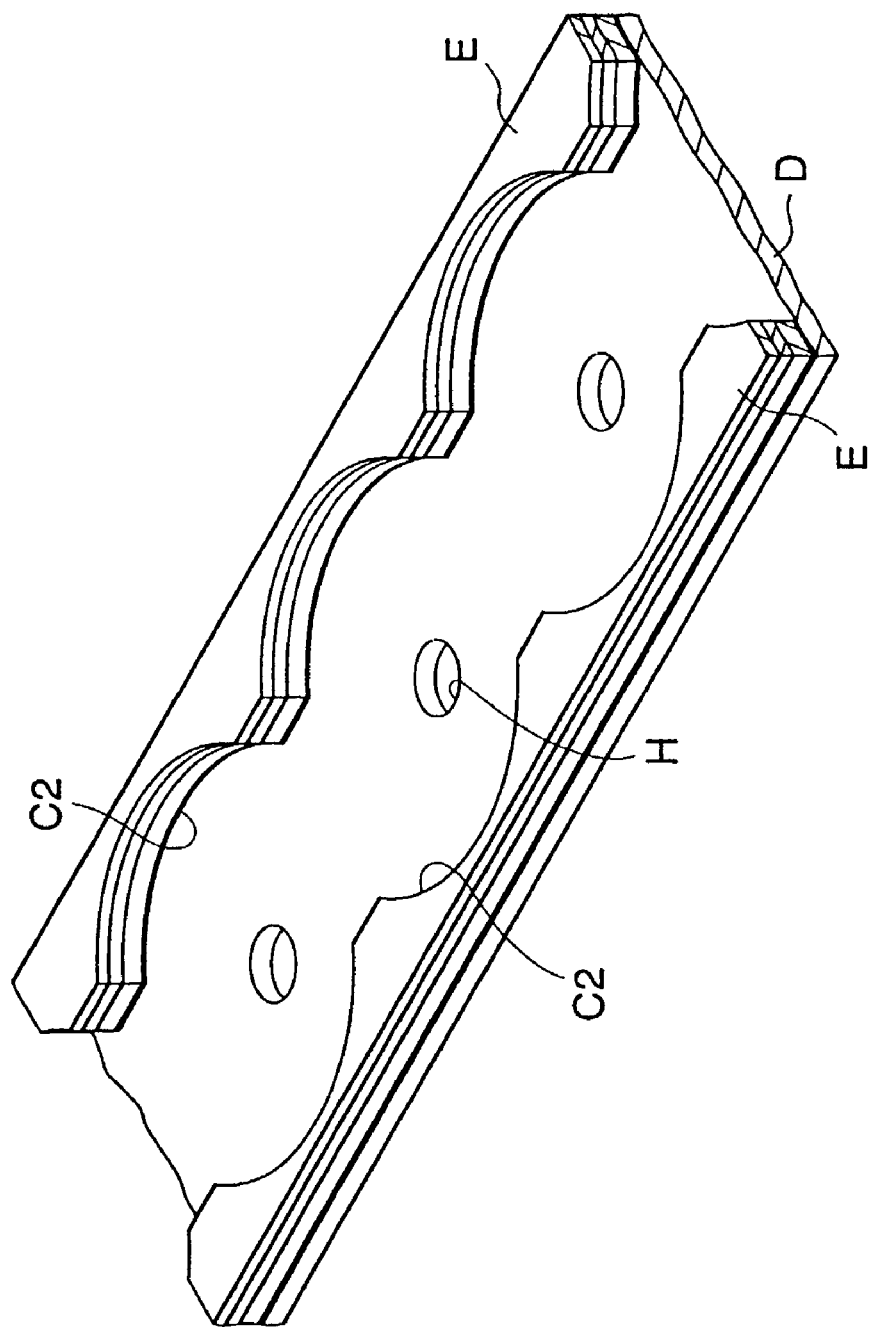
FIG. 9 is a schematic perspective view of a release-liner seen from a direction of an arrow A in FIG. 8(A)

As shown in FIG. 8(A), the peel plate 25 positioned on the downstream side of the peeling roller 32 is provided to be capable of sharply winding around the strip material G, and peeling only the protective label L from the release-liner D. As shown in FIG. 9, the strip material G after the peeling of the protective label L is reeled by the release-liner reeling section 27 (see FIG. 2) in a state where bolster parts E are adhered to both end sides of the release-liner D.

Figure 10:
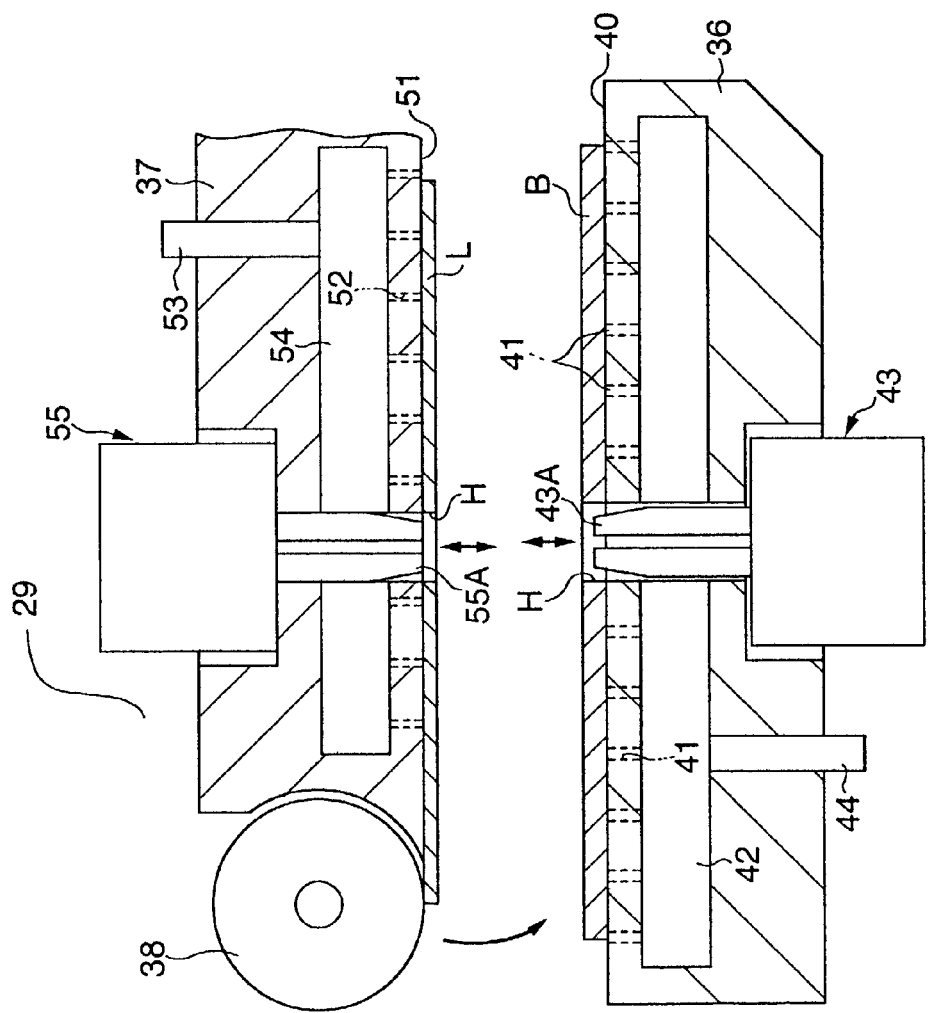
FIG. 10 is a schematic enlarged view of laminating means.

As shown in FIG. 2, and FIGS. 10–13, the laminating means 29 includes a table 36 as a first holder for holding the DVR recording substrate B, a label holder 37 as a second holder provided to be movable relative to the table 36 and to hold the protective label L, and a laminating roller 38 as a pressing member integrally provided adjacently to a left side of the label holder 37 in FIG. 10.

The table 36 includes an upper surface 40 for loading, sucking and holding the DVR recording substrate B thereon, a plurality of suction holes 41 opened to the upper surface 40 side, a chamber 42 linked to the suction holes 41 and connected to a pipe 44 linked to a not-shown vacuum generator or the like, and a chuck 43 provided roughly in a center as positioning means for holding the DVR recording substrate B roughly in a fixed position. A tip part 43A of the chuck 43 is provided capable of moving in upper and lower directions with the upper surface 40 as a reference, and extending/contracting in a diameter direction. That is, the tip part 43A of the chuck 43 is protruded from the upper surface 40 before the DVR recording substrate B is loaded on the table 36; and when the center hole H of the DVR recording substrate B is fitted around the tip part 43A, the tip part 43A is pushed wide in a diameter direction to position the DVR recording substrate B. Then, when the DVR recording substrate B is sucked and held on the table 36, the tip part 43A reduces in diameter, and retreats below the upper surface 40. The tip part 43A may be formed in a pointed shape without extending/contracting.

Figure 12:
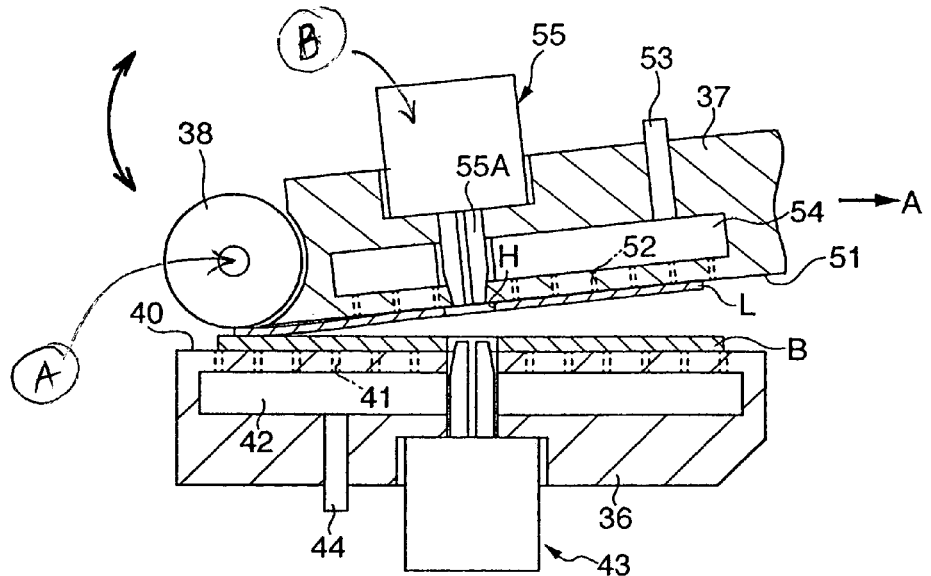
FIG. 12 is a sectional view similar to FIG. 10, showing a state at starting time of laminating.
Figure 13:
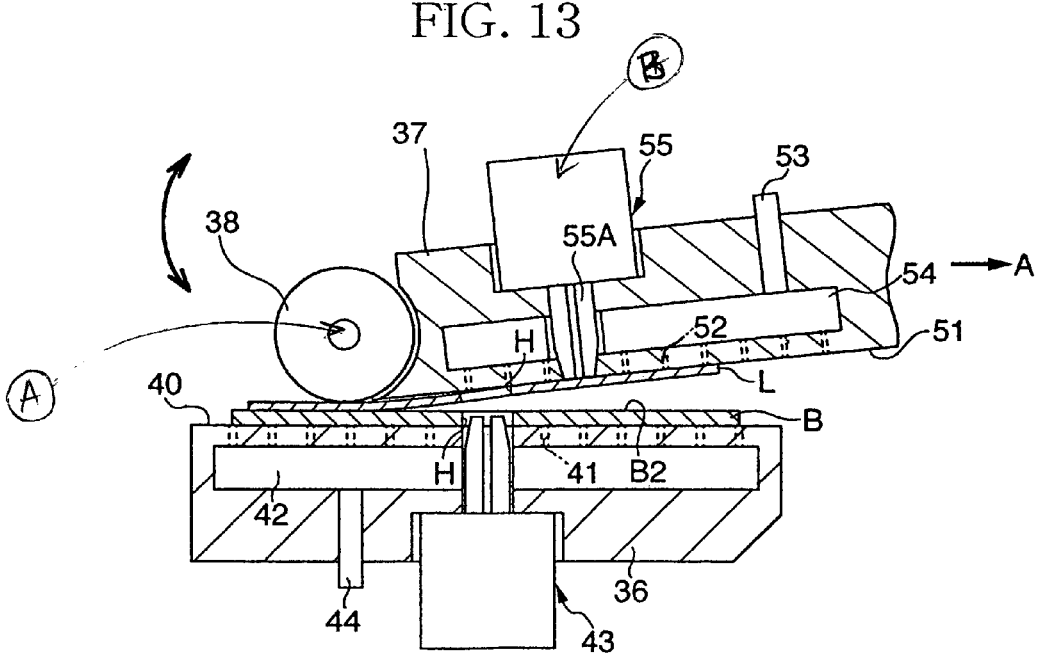
FIG. 13 is a sectional view similar to FIG. 10, showing a state in process of laminating.

As shown in FIG. 2, the label holder 37 includes both of a rotating mechanism 45 capable of rotationally displacing the laminating roller 38 on a left end in upper and lower directions around a fulcrum P positioned in a right lower side, and a horizontal moving mechanism 46 that drives integrally the label holder 37 and the laminating roller 38 in left and right directions in FIG. 2. Owing to this, the label holder 37 can move, relative to the table 36, in upper and lower directions and in a horizontal direction. The rotating mechanism 45 includes a link 48 connected to the fulcrum P of the label holder 37, and a cylinder 49 connected to one end of the link 48; and is, driven by the cylinder 49, capable of swinging the label holder 37 and the laminating roller 38 in upper and lower directions (FIGS. 12 and 13). As shown in FIG. 10, the label holder 37 includes a holding surface 51 for the protective label L, a plurality of suction holes 52 distributed asymmetrically around a central region and opened to the holding surface 51 side, a chamber 54 linked to the suction holes 52 and connected to a pipe 53 linked to a not-shown vacuum generator or the like, and a chuck 55 provided in a mechanism substantially identical to that of the chuck 43 to serve as positioning means for holding the protective label L roughly in a fixed position, and is constituted so that the protective label L is sucked and held roughly in a fixed position by suctioning the upper surface of the protective label L through the suction holes 52. The chuck 55 is provided in such a manner that its tip part 55A can be extended/contracted in a diameter direction in a state of being inserted into the center hole H of the protective label L. At a point of time when the protective label L is peeled by the peel plate 25, while being held thereon, the tip part 55A is protruded from the holding surface 51. When inserted into the center hole H of the protective label L, the tip part 55A is pushed wide in the diameter direction to position the protective label L roughly in the fixed position. A suction force of each suction hole 52 is set to a level capable of holding the protective label L. In the embodiment, a shaft center position of the laminating roller 38 at the lowermost end side is roughly positioned on a left end side, in FIG. 10, of the protective label L where it is positioned. When the protective label L is sucked and held on the label holder 37, the tip part 55A of the chuck 55 is retreated to the inside of the holding surface 51.

Figure 11:
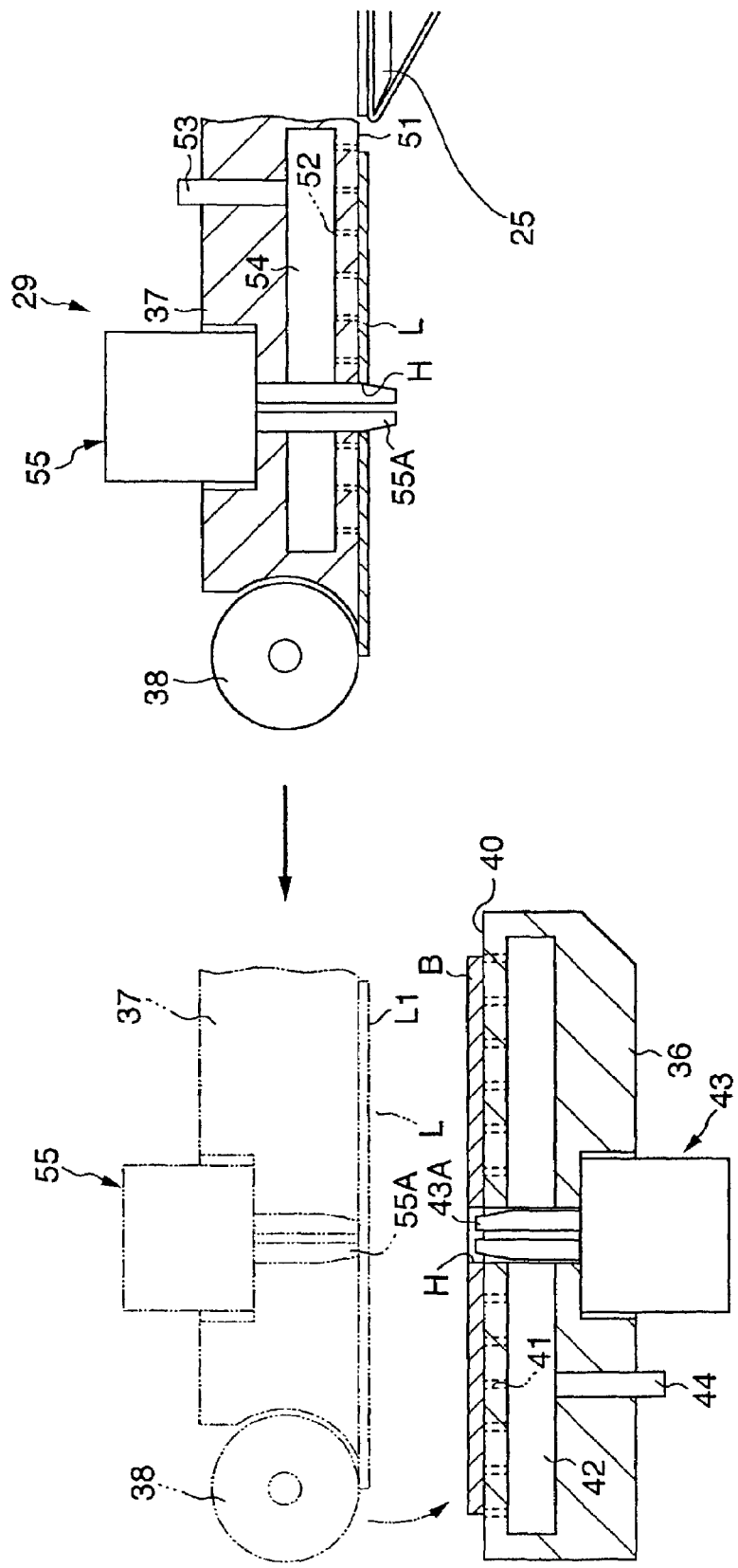
FIG. 11 is a sectional view similar to FIG. 10, showing a state before laminating.

The laminating roller 38 is an elastic body having hardness of a silicon material set in a range of about 30° to 70°, and finishing accuracy of an outer peripheral surface set in a range of about 1/100 mm to 5/100 mm. As for the laminating roller 38, other rollers can be applied as long as they are provided so as to prevent damaging of the surface of the protective label L. For example, a rubber roller of a teflon-coated butyl rubber, and a mirror-finished steel material having roller surface finishing set in a range of about 1/1000 mm to 5/1000 mm can be used. As shown in FIGS. 11–13, the laminating roller 38 is rolled on the surface (upper surface) of the protective label L laminated on the DVR recording substrate B on the table 36 by movement and rotation of the label holder 37 from a left end side to a right end side shown in FIGS. 12 and 13, thereby applying a pressing force of 4 kgf or lower to the protective label L along the rolling direction. In this case, a feed speed of the laminating roller 38, which is a moving speed of the label holder 37, is set in a range of $\geqq 20$ mm/s to $\leqq 400$ mm/s to adhere the protective label L to the DVR recording substrate B. Owing to this, it is possible to suppress a bowing deformation amount in a circumferential direction (tangential skew), which will be described later, of the DVR 10 constructed by laminating the protective label L to the DVR recording substrate B within a desired range.

Now, description will be made on a laminating process of the protective label L by the laminating means 29 with reference to FIG. 2 and FIGS. 11–13.

As shown in FIG. 2, the DVR recording substrate B is sucked and held on the table 36 beforehand, and the label holder 37 is placed on standby in a position directly above the peel plate 25. In this state, when the protective label L is peeled from the strip material G by the peel plate 25 as described above, the protective label L is sucked and held on the label holder 37 directly above; the tip part 55A of the chuck 55 is protruded; as shown in FIG. 11, the label holder 37 having the protective label L sucked and held thereon is moved roughly horizontally toward an upper position of the table 36 integrally with the laminating roller 38; an adhesive layer L1 on the lower side of the protective label L and the upper surface of the DVR recording substrate B are set to face each other in a position where shaft centers of the tip parts 55A and 43A of the chucks 55 and 43 roughly coincide with each other as indicated by a chain double-dashed line in FIG. 11; and then the horizontal movement of the label holder 37 is stopped. In this state, the tip parts 43A and 55A of the table 36 side and the label holder 37 are respectively retreated inside thereof. Then, the cylinder 49 (see FIG. 2) is driven to tilt the laminating roller 38 side attached integrally with the label holder 37 downward and, as shown in FIG. 12, an end of the protective label L positioned below the laminating roller 38 is brought into contact with a left end side of the DVR recording substrate B. Thus, the left end side of the protective label L in the drawing is pressed by the laminating roller 38, and the left end side of the protective label L in the drawing is first laminated to the end of the DVR recording substrate B.

Then, the label holder 37 is moved in a shown right direction (direction of an arrow A) integrally with the laminating roller 38 while the tilted posture of the label holder 37 shown in FIG. 12 is maintained. In this case, as shown in FIG. 13, in a state where the protective label L is pressed to a recording layer B2 surface of the DVR recording substrate B, following the movement of the label holder 37 at a predetermined speed, the label holder 37 is shifted in a surface direction of the protective label L while the protective label L is sucked thereon. As a result, following the movement of the label holder 37 in the direction of the arrow A, a holding area of the protective label L by the label holder 37 is gradually reduced, and the lowermost end position of the outer peripheral surface of the laminating roller 38 for applying a pressing force to the protective label L is gradually moved from a left end side to a right end side in FIG. 13. Thus, the DVR recording substrate B and the protective label L are gradually laminated to each other toward the right side while air therebetween is released to the right side in FIG. 13.

After the laminating of the protective label L to the DVR recording substrate B, the tilted posture of the label holder 37 is released; the label holder 37 and the laminating roller 38 are moved horizontally rightward from the table 36 to return to the position directly above the peel plate 25 (see FIG. 2) and the DVR 10 composed of the DVR recording substrate B having the protective label L laminated thereto is removed from the table 36; a next DVR recording substrate B is loaded on the table 36 with a recording layer B2 side set as an upper surface; and the operation is performed repeatedly.

Next, effects of a pressing force, hardness and feed speed of the laminating roller 38 on bowing deformation of the DVR 10 after the laminating of the protective label L were investigated by using the laminating apparatus 20.

Specifically, bowing deformation of the DVR 10 was measured after laminating of the protective label L for each case by changing a pressing force, hardness and feed speed of the laminating roller 38 independently.

Figure 14:
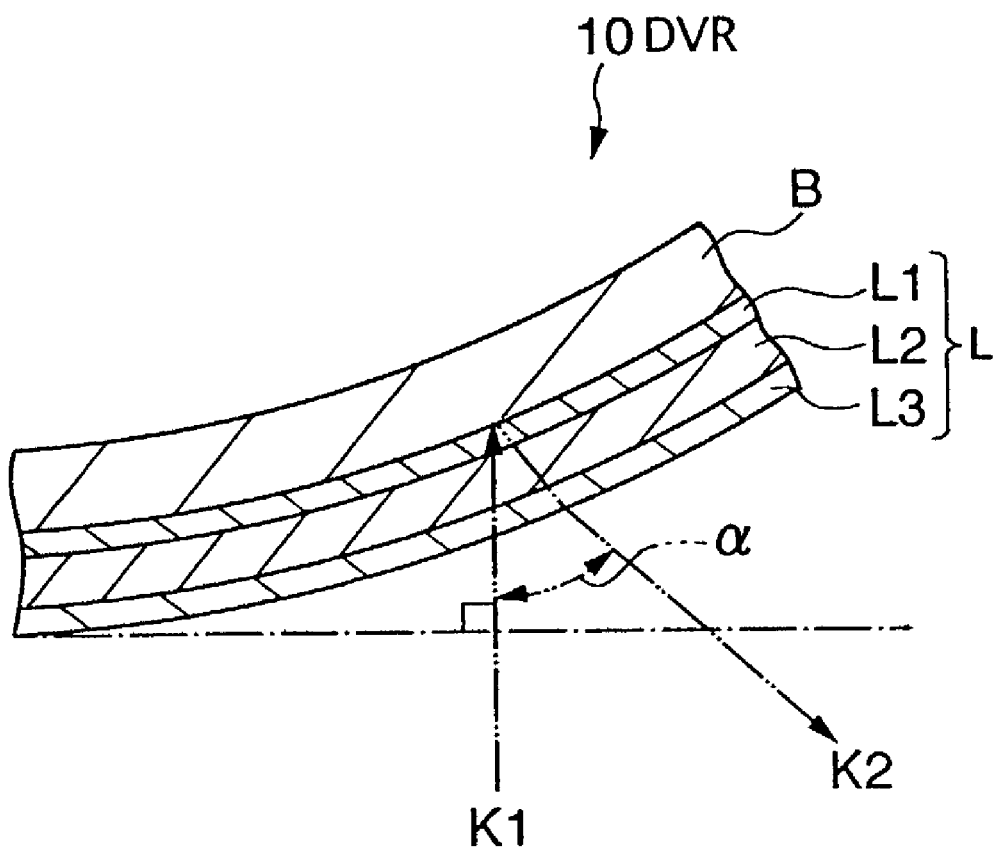
FIG. 14 is a partially enlarged sectional view of the DVR explaining a deflection angle.

As shown in FIG. 14, the measurement of bowing deformation was carried out by irradiating a collimated light from a lower side, i.e., a reading surface (hard-coated layer L3) side, and measuring a deflection angle $\alpha$ formed between the incident light K1 and its reflected light K2. Here, the bowing of a disc such as the DVR 10 is classified into bowing of a radial direction (radial skew) and bowing of a circumferential direction (tangential skew). Among them, bowing caused by laminating between the protective label L and the DVR recording substrate B is mainly a tangential skew. Thus, for measurement of the deflection angle $\alpha$, a maximum deflection angle $\alpha$ of the tangential skew, i.e., a deflection angle $\alpha$ of the outermost peripheral side of a disc being a radius of about 58 mm, was measured.

First, investigation was conducted into effects on the tangential skew by changing the pressing force of the laminating roller 38. FIG. 15(A) shows the result of the investigation. In this case, a feed speed of the laminating roller 38 was set to 30 mm/s, and roller hardness to 70°.

Next, investigation was conducted into effects on the tangential skew by changing the hardness of the laminating roller 38. FIG. 15(B) shows the result of the investigation. In this case, the feed speed of the laminating roller 38 was set to 30 mm/s, and the pressing force 4 kgf.

Further, investigation was conducted into effects on the tangential skew by changing the feed speed of the laminating roller 38. FIG. 15(C) shows the result of the investigation. In this case, the pressing force of the laminating roller 38 was set to 4 kgf, and roller hardness to 70°.

Examination of the results verifies that, since almost no trouble occurs with disc recording/reading in the case where the deflection angle $\alpha$ is below 0.2°, no disc bowing deformation that impedes disc recording/reading will occur when a pressing force of the laminating roller 38 is set not higher than 4 kgf, hardness not lower than 30°, and a feed speed in a range of 20 mm/s to 400 mm/s. A lower limit of a pressing force of the laminating roller 38 may be about 1 kgf, preferably about 3 kgf. However, it is not limited to such a value, and a lower limit of the pressing force of the laminating roller 38 can be set below about 1 kgf as long as the protective label L can be laminated to the DVR recording substrate B without any intrusion of air therebetween.

Therefore, the first embodiment is advantageous in that the operation of laminating the protective label L to the DVR recording substrate B can be automated and, further, bowing deformation of the DVR after the laminating operation can be prevented.

Moreover, as long as the DVR recording substrate B and the protective label L can be positioned roughly in the fixed positions, other positioning means different in structure from that of the chucks 43 and 55 can be employed, and the positioning means may be provided in one of the table 36 and the label holder 37.

Next, description will be made on a second embodiment of the invention. In the description bellow, components identical or similar to those of the first embodiment are denoted by identical reference symbols, and explanation thereof will be omitted or made briefly.

Second Embodiment

Figure 16:
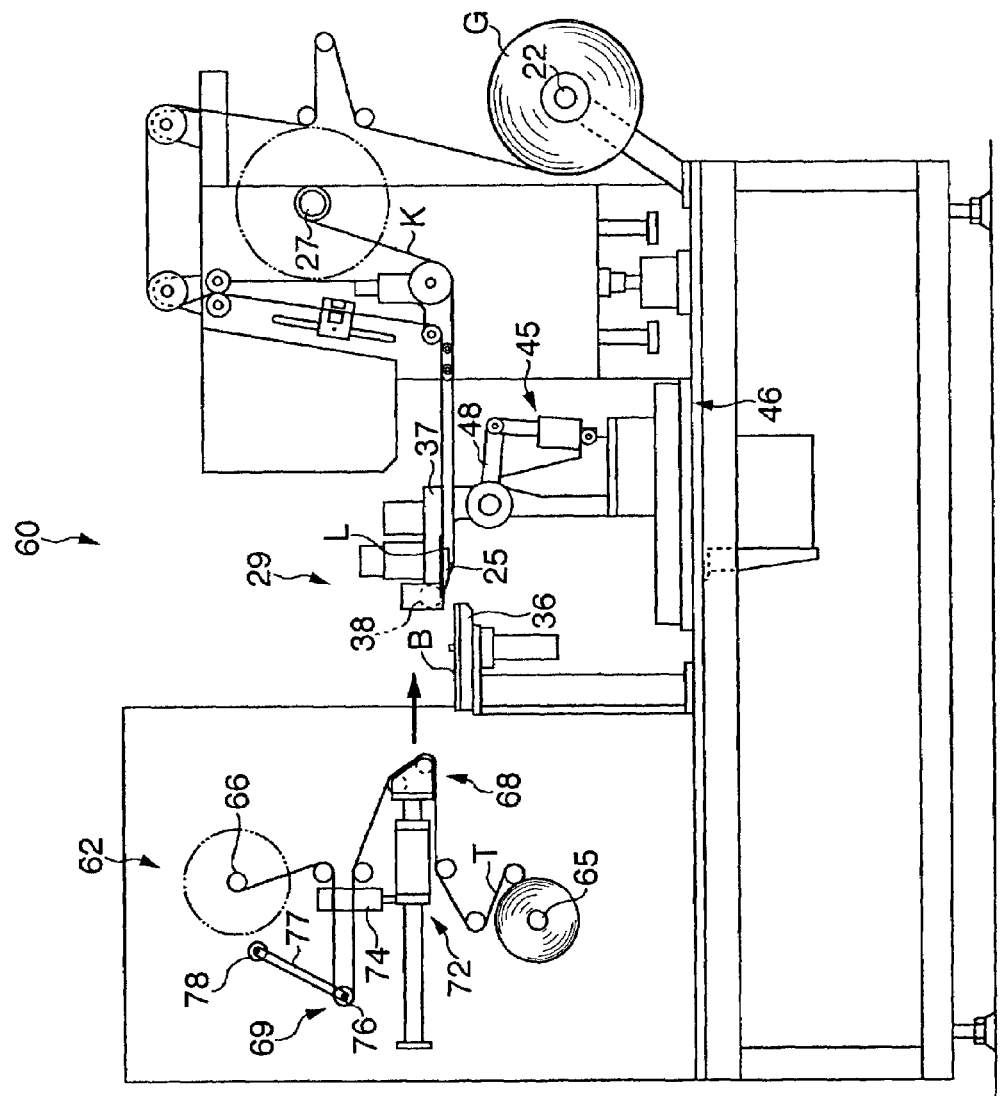
FIG. 16 is a schematic side view showing a laminating apparatus of a second embodiment.

As shown in FIG. 16, a laminating apparatus 60 of a second embodiment is partially changed in structure from that of the laminating apparatus 20 of the first embodiment, and is characterized in that a protective film P1 can be peeled after laminating of a protective label to the DVR recording substrate B (FIGS. 18 to 22).

The laminating apparatus 60 is not provided with the front side peeling means 24 of the first embodiment for peeling the protective film P1 before the laminating of the protective label L to the DVR recording substrate B. Instead, front side peeling means 62 different in constitution from the front side peeling means 24 is provided on a left side of a table 36 shown in FIG. 16. Other constitution is substantially identical to that of the first embodiment.

The strip material G supplied from the label supply reel 22 is sent as it is to the peel plate 25. The protective label L having the protective film P1 is peeled from the release-liner D, and the release-liner D is reeled by the release-liner reeling section 27.

As in the case of the first embodiment, the protective label L having the protective film P1 peeled by the peel plate 25 is sucked and held on the label holder 37, and laminated to the DVR recording substrate B on the table 36. Then, by the front side peeling means 62, the protective film P1 is peeled from the protective label L laminated to the DVR recording substrate B.

Figure 17:
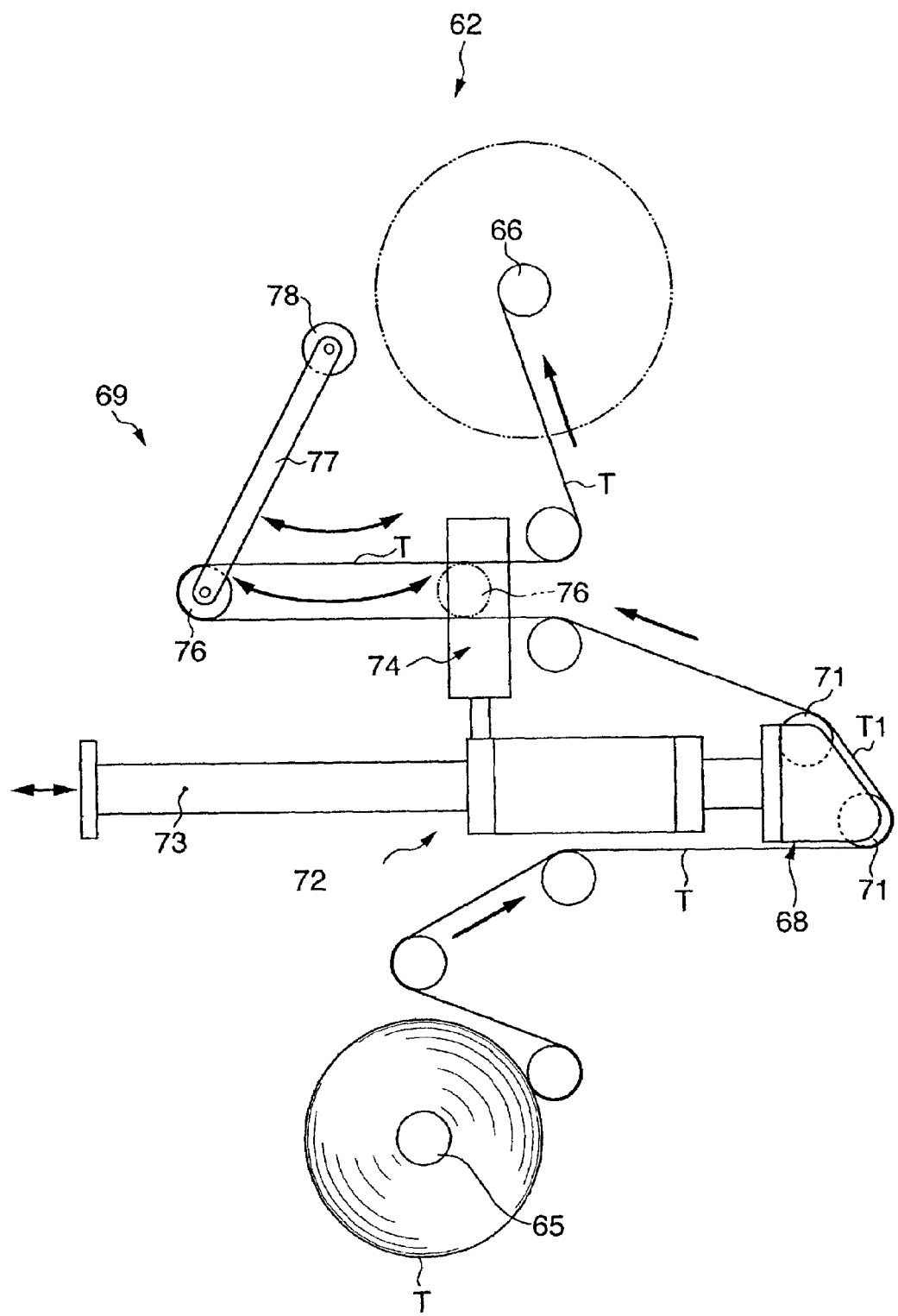
FIG. 17 is an enlarged view of front side peeling means.

As shown in FIG. 17, the front side peeling means 62 includes a tape supply reel 65 for holding an adhesive tape T having adhesive strength higher than that of the protective film P1; a refuse reel-up reel 66 positioned above the tape supply reel 65 and, to serve as reel-up means, reels up the adhesive tape T supplied from the tape supply reel 65 driven by a not-shown motor; a peeling head 68 as a pressing member in which the adhesive tape T is wound around between the tape supply reel 65 and the refuse reel-up reel 66; and tension control means 69 of the peeled tape T provided between the peeling head 68 and the refuse reel-up reel 66.

The peeling head 68 includes two upper and lower guide rollers 71, 71, around which the adhesive tape T is wound so as to set an adhesive surface T1 thereof as a front side. The peeling head 68 is provided to be capable of reciprocating movement in a horizontal direction between an initial position and its right position by a slider 72 having a built-in cylinder extending to a left side as is shown in FIG. 17, and swinging up and down by driving of a cylinder 74 linked to an upper portion of the slider 72.

The tension control means 69 is constituted of a dancer roller 76 around which the adhesive tape T is wound, a connecting arm 77 whose one end is connected to the dancer roller 76, and an arm supporting member 78 connected to the other end of the connecting arm 77 to rotatably support the same; and is provided to be movable between a position indicated by a solid line to be an initial position of the dancer roller 76 and a position indicated by a chain double-dashed line in FIG. 17. The tension control means 69 is provided so as to set a next protective film P1 to be adhered and peeled by the adhesive tape T at a predetermined position in a state capable of being adhered and peeled by swinging the dancer roller 76 from the initial position to a right side according to an amount of the movement of the peeling head 68 when it is horizontally moved from an initial position of FIG. 18 to a right side (FIG. 19) in a locked state of the not-shown motor for driving the refuse reel-up reel 66 for reeling up the adhesive tape T. In this case, the adhesive tape T is supplied from the tape supply reel 65 by a length roughly equal to the moving amount of the peeling head 68.

Figure 18:
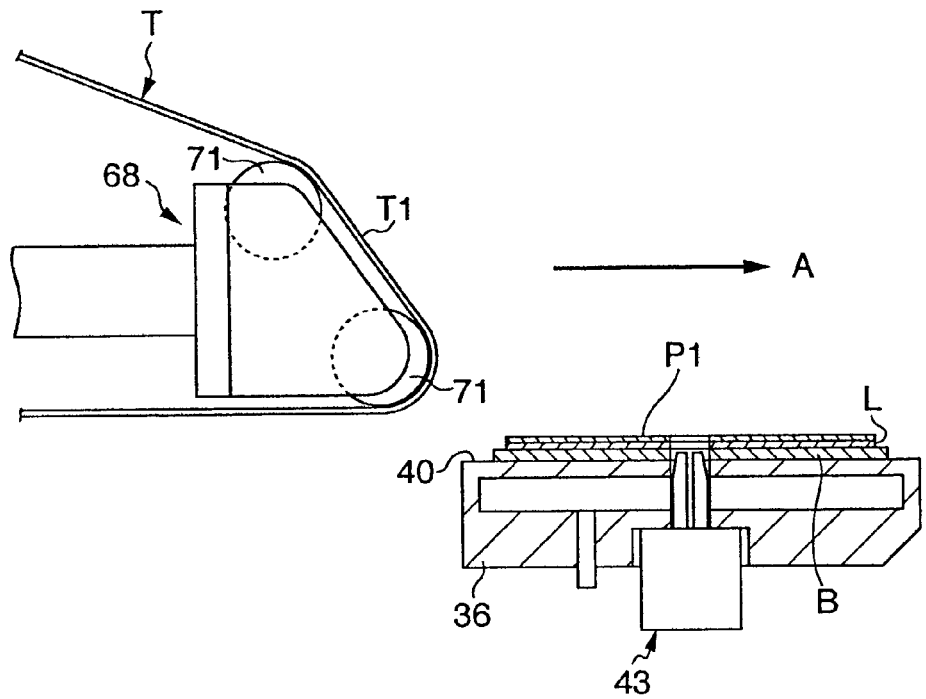
FIG. 18 is a partially enlarged view of FIG. 17 explaining a moving state of a peeling head from an initial position to a table.
Figure 19:
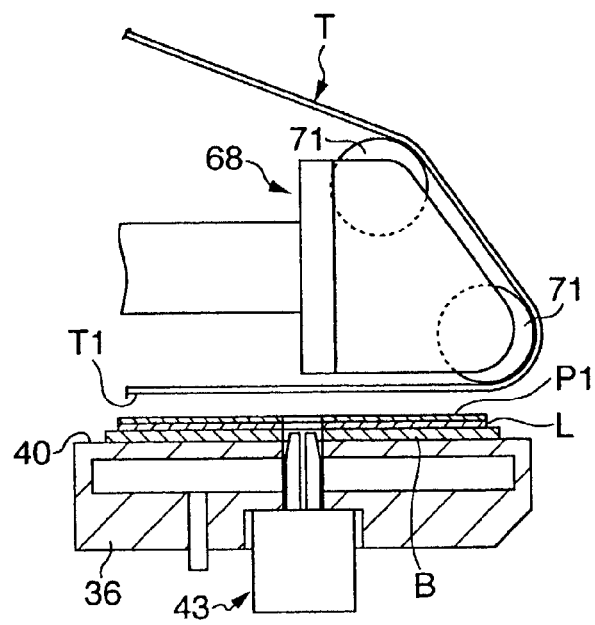
FIG. 19 is an enlarged view similar to FIG. 18, explaining a facing state of the peeling head to the table.
Figure 20:
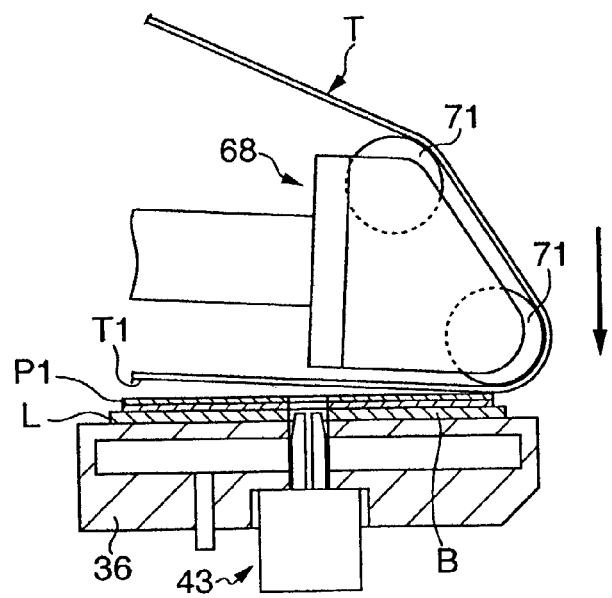
FIG. 20 is an enlarged view similar to FIG. 18, explaining a state at starting time of peeling.
Figure 21:
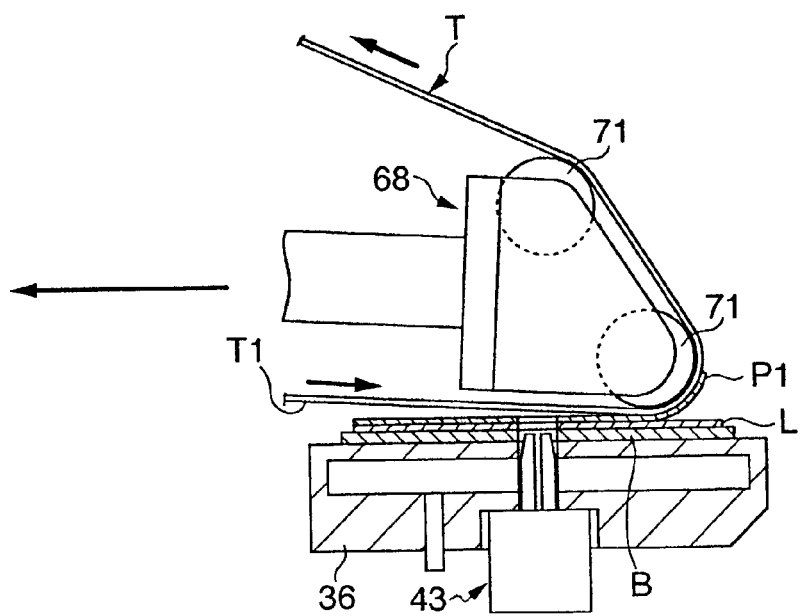
FIG. 21 is an enlarged view similar to FIG. 18, explaining a state in peeling process.
Figure 22:
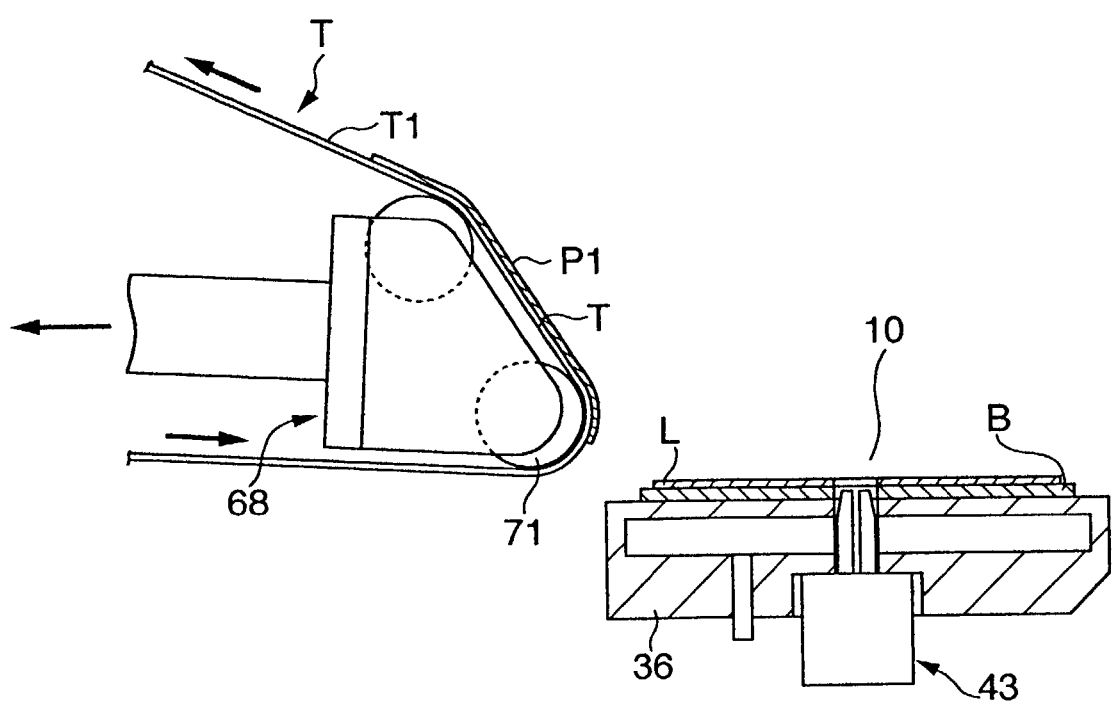
FIG. 22 is an enlarged view similar to FIG. 18, explaining a state after completion of peeling.

The peeling of the protective film P1 by the front side peeling means 62 is carried out in the following process. That is, the not-shown motor of the refuse reel-up reel 66 is locked; and, as shown in FIG. 18, after the protective label L having the protective film P1 is laminated to the DVR recording substrate B loaded, sucked and held on the table 36 by the laminating means 29, the peeling head 68 is horizontally moved from the initial position to the right side (direction of an arrow A). Then, as shown in FIG. 19, when a tip side of the peeling head 68 is positioned at an upper portion above the right end side of the protective film P1, the tip side of the peeling head 68 supported freely rotatably around a fulcrum 73 (see FIG. 17) is rotated downward by the cylinder 74 (see FIG. 17) as shown in FIG. 20; the peeling head 68 is set in a tilted posture; and the adhesive surface T1 of the adhesive tape T is adhered to the right end side of the protective film P1. Then, by driving of the not-shown motor, supplying of the adhesive tape T is started and, as shown in FIG. 21, the peeling head 68 is horizontally moved in a direction of returning to the initial position at a moving speed following a supplying speed of the adhesive tape T while the tilted posture is maintained. In this case, since the adhesive tape T has adhesive strength higher than that of the protective film P1, the protective film P1 is adhered to the adhesive tape T toward the moving direction of the peeling head 68 and, owing to this, the protective film P1 is gradually peeled off from the protective label L. Then, as shown in FIG. 22, when the peeling head 68 is moved to a left side of the protective label L, the protective film P1 is completely peeled from the protective label L; and the peeled protective film P1 is reeled up by the refuse reel-up reel 66 (see FIG. 17) integrally with the adhesive tape T. Then, the peeling head 68 is returned to the initial position and placed on standby, and the protective film P1 is peeled to form a DVR 10. Subsequently, the DVR 10 sucked and held on the table 36 is removed by a not-shown robot arm or the like. A next DVR recording substrate B having a protective film P1 adhered to a protective label L is loaded, sucked and held on the table 36, and the operations are performed repeatedly.

Therefore, the second embodiment is advantageous in that because of the peeling of the protective film P1 after the laminating operation between the DVR recording substrate B and the protective label L, damaging of the surface of the protective label L during the laminating operation can be prevented.

The constitution of each part of the apparatus of the invention is not limited to the illustrated constitutional example. Various modifications and changes can be made as long as substantially similar operations are carried out.

As descried above, according to the present invention, since the peeling means for peeling the release-liner from the protective label having the predetermined release-liner superimposed on at least one surface, and the laminating means for laminating the protective label to the optical disc recording substrate by pressing the protective label before or after the peeling of the release-liner to a recording layer surface of an optical disc recording substrate by a predetermined pressing force are provided, the protective label can be automatically laminated to the optical disc recording substrate, making it possible to increase manufacturing efficiency of an optical disc.

In the case where the front side peeling means is employed for peeling a sheet material from the protective label after the laminating of the protective label to the recording layer surface side of the optical disc recording substrate, it is possible to effectively prevent damaging of the surface side of the protective label during the laminating of the protective label to the optical disc recording substrate.

Further, the front side peeling means includes the pressing member for pressing and adhering an adhesive tape having adhesive strength higher than that of the sheet material to the sheet material; and the adhesive tape reel-up means provided on the downstream side of the pressing member; wherein the sheet material can be peeled from the protective label while the adhesive tape is reeled up by relative displacement of the sheet material and the pressing member. Thus, it is possible to surely peel the sheet material from the protective label by a relatively simple mechanism.

Further, since the pressing member is provided to apply a predetermined pressing force to the protective label laminated on the recording layer surface of the optical disc recording substrate by relative displacement of the first and second holders respectively adapted to hold the optical disc recording substrate and the pressing member presses, while it is gradually moved from one end side of the protective label to the other end side, the protective label to be gradually laminated to the recording layer surface of the optical disc recording substrate along the moving direction of it, the laminating can be carried out while air present therebetween is released to the other end side of the protective label; and bubbles or the like can be prevented from being left on the optical disc after the laminating of the protective label.

Further, since the pressing member and the second holder are integrated and the protective label can be pressed by the relative displacement of the first and second holders, a mechanism for independently moving the pressing member is made unnecessary, making it possible to miniaturize the entire apparatus.

Since the pressing member comprises the roller capable of rolling on the protective label, roller hardness is set equal to/higher than 30°, a pressing force applied by the pressing member to the protective label is set not higher than 4 kgf, and/or a moving speed of the pressing member is set in a range of 20 mm/s to 400 mm/s, occurrence of optical disc bowing deformation that impedes data reading/recording can be prevented by simple means.

Further, since the pressing member is made of the steel material and, furthermore, its surface is mirror-finished, it is possible to prevent damaging of the surface side of the protective label caused by contact between the roller and the protective label.

And since the first and/or second holder is provided with the positioning means for holding the protective label and/or the optical disc recording substrate roughly in the fixed position, it becomes possible to laminate the protective label to the optical disc recording substrate more accurately.

What is claimed is:

1. A laminating apparatus for laminating a protective label to an optical disc recording substrate wherein said protective label in an initial state includes a sheet material adhered to a front side and a release-liner superimposed on a back side, said apparatus comprising:
   a back side peeling station for peeling said release-liner from said protective label,
   a laminating station for laminating said protect label to said optical disc recording substrate by pressing an adhesive layer surface of said protective label exposed after the peeling of said release-liner to said optical disc recording substrate with a predetermined pressing force, and
   a front side peeling station for peeling said sheet material from said protective label after the laminating of said protective label to said optical disc recording substrate; wherein
   said laminating station comprises:
   a disc holder for holding said optical disc recording substrate;
   a label holder for holding said protective label, said label holder being moveable relative to said disc holder; and
   a roller for applying said predetermined pressing force to laminate said protective label to said optical disc recording substrate held by said disc holder, wherein said roller is rotatable about a rotational shaft which is fixed to be stationary relative to said label holder; and
   said label holder includes;
   a vacuum box; and
   a planar surface on which the protective label is held and which has a plurality of suction holes in communication with the vacuum box.

2. The laminating apparatus according to claim 1, wherein:
   said front side peeling station comprises a pressing roller for pressing and adhering an adhesive tape having an adhesive strength higher than that of said sheet material to said sheet material, and an adhesive tape take-up reel provided on a downstream side of said pressing roller for rewinding said adhesive tape with the peeled sheet material adhered to said rewound adhesive tape.

3. The laminating apparatus according to claim 1, wherein said front side peeling station includes a pressing roller lowerable on said disc holder for pressing and adhering an adhesive tape having an adhesive strength greater than that of the sheet material to said sheet material on the front side of the protective label laminated onto said optical disc recording substrate being held on said disc holder.

4. The laminating apparatus according to claim 3, wherein said front side peeling station further comprising
   a supply reel and a take-up reel of said adhesive tape positioned on the upstream and downstream sides of said pressing roller, respectively; and a dancer roller between said supply reel and take-up reel for maintaining a tension of said adhesive tape.

5. The laminating apparatus according to claim 1, wherein said planar surface further includes a central region corresponding to a hole in said protective label when said protective label is held on said planar surface; and said suction holes are distributed around said central region, whereby a peripheral portion of said protective label is located outside said suction holes to be pressed by said roller onto said optical disc recording substrate.

6. A laminating apparatus for laminating a protective label to an optical disc recording substrate, said apparatus comprising:

a disc holder for holding said optical disc recording substrate;

a label holder for holding said protective label, said label holder being moveable relative to said disc holder; and a roller for applying a predetermined pressing force to laminate said protective label to said optical disc recording substrate held by said disc holder;

wherein said roller is moveable together with said label holder relative to said disc holder; at least one of said disc and label holders comprises a shaft corresponding to a hole in said optical disc recording substrate or said protective label for positioning said optical disc recording substrate or said protective label in a predetermined position on said at least one of said disc and label holders;

said shaft is extendable and retractable in length; and said label holder includes:

a vacuum box; and a planar surface on which the protective label is held and which has a plurality of suction holes in communication with the vacuum box.

7. The laminating apparatus according to claim 6, wherein said planar surface further includes a central region corresponding to the hole in said protective label when said protective label is held on said planar surface; and said suction holes are distributed around said central region, whereby a peripheral portion of said protective label is located outside said suction holes to be pressed by said roller onto said optical disc recording substrate.

8. A laminating apparatus for laminating a protective label to an optical disc recording substrate, said apparatus comprising:

a disc holder for holding said optical disc recording substrate;

a label holder for holding said protective label, said label holder being moveable relative to said disc holder; and a roller for applying a predetermined pressing force to laminate said protective label to said optical disc recording substrate held by said disc holder;

wherein said roller is moveable together with said label holder relative to said disc holder;

at least one of said disc and label holders comprises a shaft corresponding to a hole in said optical disc recording substrate or said protective label for positioning said optical disc recording substrate or said protective label in a predetermined position on said at least one of said disc and label holders;

said shaft is extendable and retractable in length; and said shaft is also expansible and contractible in diameter.

9. A laminating apparatus for laminating a protective label to an optical disc recording substrate, said apparatus comprising:

a disc holder for holding said optical disc recording substrate;

a label holder for holding said protective label, said label holder being moveable relative to said disc holder; and a roller for applying a predetermined pressing force to laminate said protective label to said optical disc recording substrate held by said disc holder;

wherein said roller is moveable together with said label holder relative to said disc holder;

said label holder includes a vacuum box; and a planar surface on which the protective label is held and which has a plurality of suction holes in communication with the vacuum box;

said planar surface further includes a central region corresponding to a hole in said protective label when said protective label is held on said planar surface; and said suction holes are distributed asymmetrically around said central region, whereby a peripheral portion of said protective label is located outside said suction holes to be pressed by said roller onto said optical disc recording substrate.

10. A laminating apparatus for laminating a protective label to an optical disc recording substrate wherein said protective label in an initial state includes a sheet material adhered to a front side and a release-liner superimposed on a back side, said apparatus comprising:

a front side peeling station for peeling said sheet material from said protective label;

a back side peeling station for peeling said release-liner from said protective label; and a laminating station for laminating said protective label to said optical disc recording substrate by pressing said protective label to said optical disc recording substrate with a predetermined pressing force after the peeling of said sheet material and said release-liner at said front and back side peeling stations which are both positioned upstream of said laminating station;

wherein said laminating station comprises:

a disc holder for holding said optical disc recording substrate;

a label holder for holding said protective label, said label holder being moveable relative to said disc holder; and a pressing member for applying a predetermined pressing force to laminate said protective label to said optical disc recording substrate held by said disc holder;

wherein at least one of said disc and label holders comprises a shaft corresponding to a hole in said optical disc recording substrate or said protective label for positioning said optical disc recording substrate or said protective label in a predetermined position on said at least one of said disc and label holders;

said shaft is extendable and retractable in length; and said shaft is also expansible and contractible in diameter.

11. A laminating apparatus for laminating a protective label to an optical disc recording substrate wherein said protective label in an initial state includes a sheet material adhered to a front side and a release-liner superimposed on a back side, said apparatus comprising:

a front side peeling station for peeling said sheet material from said protective label;

a back side peeling station for peeling said release-liner from said protective label; and a laminating station for laminating said protective label to said optical disc recording substrate by pressing said protective label to said optical disc recording substrate with a predetermined pressing force after the peeling of said sheet material and said release-liner at said front and back side peeling stations which are both positioned upstream of said laminating station;

wherein said laminating station comprises:

a disc holder for holding said optical disc recording substrate;

a label holder for holding said protective label, said label holder being moveable relative to said disc holder; and a pressing member for applying a predetermined pressing force to laminate said protective label to said optical disc recording substrate held by said disc holder; and wherein said label holder includes:

a vacuum box; and a planar surface on which the protective label is held and which has a plurality of suction holes in communication with the vacuum box.

* * * * *